United States Patent
St-Amand et al.

(10) Patent No.: US 6,526,063 B1
(45) Date of Patent: *Feb. 25, 2003

(54) SYSTEM AND METHOD FOR ATM-FR INTERWORKING OF SVC SIGNALLING

(75) Inventors: Marc St-Amand, Aylmer (CA); Yvon Gilbert, Chevreuse (FR)

(73) Assignee: Nortel Networks Limited, St. Laurent (CA)

(*) Notice: Subject to any disclaimer, the term of this patent is extended or adjusted under 35 U.S.C. 154(b) by 0 days.

This patent is subject to a terminal disclaimer.

(21) Appl. No.: 09/219,317

(22) Filed: Dec. 23, 1998

(51) Int. Cl.[7] .............................................. H04L 12/28
(52) U.S. Cl. .................................... 370/395.5; 370/466
(58) Field of Search ................................ 370/466, 225, 370/236, 395.1, 405, 496, 522, 351, 352, 389, 397, 399, 395.2, 395.21, 395.43, 395.5, 395.51, 395.52, 438

(56) References Cited

U.S. PATENT DOCUMENTS

| | | | |
|---|---|---|---|
| 5,315,588 A | * 5/1994 | Kajiwara et al. | ........... 370/389 |
| 6,021,136 A | * 2/2000 | Bharucha et al. | ........... 370/236 |
| 6,023,474 A | * 2/2000 | Gardner et al. | ............. 370/467 |
| 6,298,059 B1 | * 10/2001 | St-Amand et al. | .......... 370/397 |
| 6,347,088 B1 | * 2/2002 | Katou et al. | ............. 370/395.2 |

OTHER PUBLICATIONS

"Voice and Telephony Over ATM–ATM Trunking using AAL1 for Narrowband Services Version 1.0". AF–V-TOA–0089.000. ATM Forum. Jul., 1997.*

Greenstein, Larry. "Frame Relay and Frame–Based ATM: A Comparison of Technologies". Jun. 1995.*

Fowler, Henry J. and Murphy, James W. "Network Management Considerations for Interworking ATM Networks with Non–ATM Services". Jun. 1996.*

Pretty, Russell and Morin, Mariannne. "Frame Realy Interworking with Asychronous Transfer Mode". Apr. 20, 1992.*

Dixit, Sudhir and Elby, Stuart. "Frame Relay and ATM Interworking". Jun. 1996.*

Doug O'Leary, Bell Atlantic, "Frame Relay/ATM PVC Network Interworking Implementation Agreement", Dec. 20, 1994, pp. 1–17.

Digital Subscriber Signalling System No. 1, Network Layer, Digital Subscriber Signalling System No. 1 (DSS 1)—Signalling Specification for Frame Mode Basic Call Control, ITU–T Recommendation Q.933, Mar. 1993, pp. 1–71.

Integrated Services Digital Network (ISDN), Internetwork Interfaces, Frame Relaying Bearer Service Interworking, ITU–T Recommendation I.555, Nov. 1993, pp. 1–18.

* cited by examiner

Primary Examiner—Melvin Marcelo
Assistant Examiner—Derrick Ferris

(57) ABSTRACT

A system and method for interworking between FR (frame relay) and ATM (asynchronous transfer mode) using permanent virtual circuits and switched virtual circuits. An ATM VCC between two interworking functions is dedicated to FR LMI signalling traffic, while the FR data traffic is carried by ATM VCCs which do not carry any FR LMI signalling traffic. The FR data traffic of a given FR DLCI is carried by an ATM VCC having a service category and bandwidth parameters which reflect the transfer priority and bandwidth needs of the particular FR DLCI. This allows a high priority to be assigned to all LMI traffic carried over the ATM network independent of the priority assigned to the FR data traffic. FR SVC (switched virtual circuit) call setup messages requesting a new SVC connection are carried over the dedicated channel. An attempt is first made to allocate space on an existing ATM VCC with appropriate service characteristics to handle the connection. If one is not available, then a new ATM VCC with the required service characteristics is established.

15 Claims, 16 Drawing Sheets

STATIC ROUTING TABLE

| FR ADDRESS | NEXT NODE |
|---|---|
| FIRST GROUP OF FR ADDRESSES | OTHER FR NODE |
| SECOND GROUP OF FR ADDRESSES | IWF - 1 |
| THIRD GROUP OF FR ADDRESSES | IWF - 2 |

FIG. 13   STATIC ROUTING TABLE EXAMPLE

SYSTEM AND METHOD FOR ATM-FR INTERWORKING OF SVC SIGNALLING

FIELD OF THE INVENTION

The invention relates to functions and methods for interworking frame relay with asynchronous transfer mode and more particularly to methods and functions which provide call setup capabilities.

BACKGROUND OF THE INVENTION

In FR (frame relay), data is sent in packets which have a two byte header and have a variable size data section (payload) which ranges in size from two to 8187 bytes. FR is connection oriented, with each packet including a connection identifier, the packets of a given connection constituting a logical frame relay connection. Each FR logical connection is identified by a DLCI (data link connection identifier). Currently, DLCIs range from 0 to 1023 with DLCI-16 through DLCI-1007 allocated for data connections. Typically, DLCI-0 is reserved to function as a signalling connection. This connection is used to set up new logical connections for example.

Between two FR switching elements there is a capability of assigning a transfer priority to each connection typically in the range of 0 to 15. FR messages include C-plane messages which are used for signalling, and U-plane messages which are used for data, the C-plane messages requiring a higher priority than U-plane messages. Between two FR switching elements high priority LMI (local management interface) C-plane messages are used to implement a handshaking protocol. This high priority assigned to LMI traffic thereby ensures that essential signalling information can get through the network notwithstanding congestion which may otherwise exist.

In ATM, data is sent in cells which have a fixed size 53 bytes including a five byte header. ATM is also connection oriented with ATM cells being carried in VCCs (virtual channel connections). One VCC represents one connection in much the same way that one DLCI represents one FR connection. Each VCC has a QoS (quality of service). The QoS's presently defined include CBR (constant bit rate) typically used for voice, VBR-rt (variable bit rate—real-time) used for real-time sensitive services, VBR—non-real-time used for services which are not real-time sensitive, UBR (unspecified bit rate) used for low priority traffic, and ABR (available bit rate) which has recently been introduced. The QoS for a VCC is fixed across all DLCIs carried over the VCC.

There needs to be the capability to connect FR devices to ATM devices and vice versa, and this capability is usually implemented by some kind of IWF (interworking function). At an IWF, this has consisted of some sort of mapping between VCCs, and incoming/outgoing logical frame relay connections (DLCIs).

Two existing FR-ATM interworking solutions adhere to two schemes of multiplexing presented in ITU-T recommendation I.555. There is also a solution proposed by FRF.5 which builds upon that of ITU-T I.555. In all of these solutions, control/signalling information is carried with no distinction from data across each ATM connection. In other words, the ATM network gives the same priority to signalling messages as to the data itself.

Historically, FR has been thought of as being applicable to non-real time applications, and as being most suitably carried by ATM VBR-nrt. Since signalling packets can be expected to satisfy VBR-nrt behaviour and the data can also be modelled as VBR-nrt, the above problem of giving the same priority to signalling as data has not been significant. However, now real-time applications for FR exist, for example voice over FR, in which case it would be useful to be able to carry FR traffic with different QoS and still be able to reliably transmit control/signalling information. The existing solutions do not permit this. If for example, the ATM UBR service is used for the data and control it is likely that some packets will be lost. While this may not be serious if a regular data packet gets lost, it is a problem if control and signalling information is not getting through reliably.

The existing interworking solutions do not provide any way of setting up FR SVCs which cross an ATM network.

SUMMARY OF THE INVENTION

It is an object of the invention to obviate or mitigate one or more of the above identified disadvantages.

A system and method for interworking between FR (frame relay) and ATM (asynchronous transfer mode) using permanent virtual circuits and switched virtual circuits are provided. An ATM VCC between two interworking functions is dedicated to FR LMI signalling traffic, while the FR data traffic is carried by ATM VCCs which do not carry any FR LMI signalling traffic. The FR data traffic of a given FR DLCI is carried by an ATM VCC having a service category and bandwidth parameters which reflect the transfer priority and bandwidth needs of the particular FR DLCI. This allows a high priority to be assigned to all LMI traffic carried over the ATM network independent of the priority assigned to the FR data traffic. FR SVC (switched virtual circuit) call setup messages requesting a new SVC connection are carried over the dedicated channel. An attempt is first made to allocate space on an existing ATM VCC with appropriate service characteristics to handle the connection. If one is not available, then a new ATM VCC with the required service characteristics is established.

Advantageously, LMI and FR SVC setup signalling can be given a higher priority on the ATM network than normal data traffic, thereby ensuring it is reliable. Furthermore, where in previous systems, FR SVC signalling has stopped at the FR-ATM boundary, the invention provides for methods and systems for propagating the FR SVC signalling across the ATM network to a far end FR device.

BRIEF DESCRIPTION OF THE DRAWINGS

Preferred embodiments of the invention will now be described with reference to the attached drawings in which:

FIG. 13 is an example of a static routing table; and

DETAILED DESCRIPTION OF THE PREFERRED EMBODIMENTS

Figure 1:
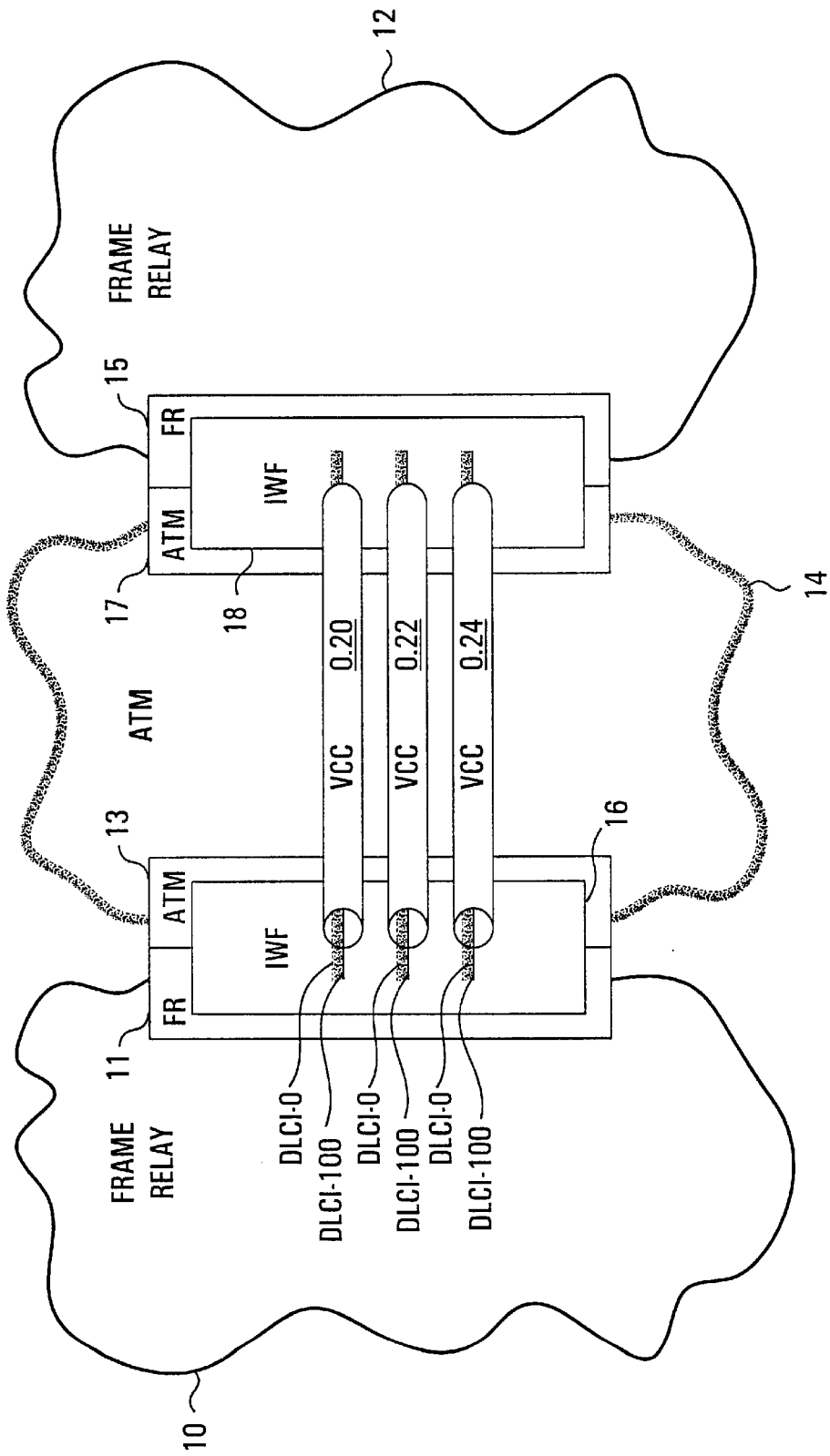
FIGS. 1–3 are schematic diagrams of conventional FR-ATM interworking solutions.
Figure 2:
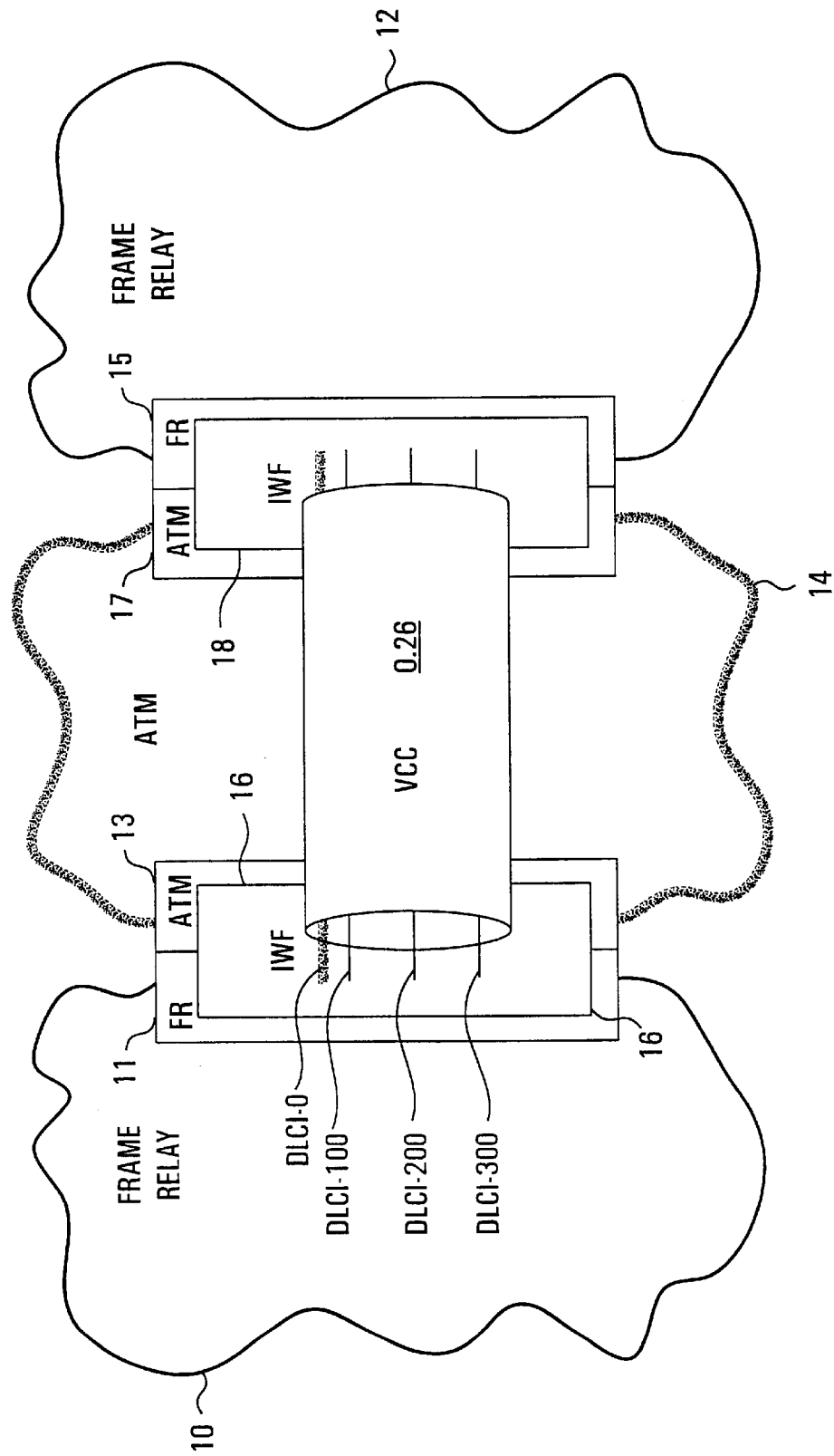

Firstly, three existing FR-ATM interworking solutions will be described with reference to FIGS. 1, 2 and 3.

In one of the existing FR-ATM network interworking solutions which adhere to ITU-T recommendation I.555, each logical FR connection is mapped to a respective DLCI in a single ATM VCC, and a respective DLCI-0 in each VCC is used to convey LMI traffic relating to that logical FR connection. Multiplexing is accomplished at the ATM layer using VCC identifiers (vpi.vpi). This is referred to as one-to-one interworking. This solution is illustrated schematically in FIG. 1. Two FR networks are represented by clouds 10,12, and an ATM network is indicated by cloud 14. At the interfaces between the FR networks and the ATM network are IWFs (inter-working functions) 16,18. The IWF 16 interworks between a near end FR node 11 and a near end ATM node 13 which may be on a single piece of hardware for example. Similarly, the far end IWF 18 interworks between a far end ATM node 17 and a far end FR node 15. The IWFs are not typically separate devices or functions from those provided by the ATM or FR nodes, but rather consist of enhancements and changes which permit a desired interworking to be achieved. Throughout this description the reference numbers for VCCs will be in the form 0.n, as this is how VCC identifiers are normally expressed. For the purpose of example, there are three logical FR connections which are carried through the ATM network on a DLCI-100 through a first VCC 0.20, a DLCI-100 through a second VCC 0.22, and a DLCI-100 through a third VCC 0.24. Also shown is a DLCI-0 on each of VCC 0.20,0.22,0.24 for carrying LMI traffic relating to the three logical FR connections. This scheme addresses the issue of FR to ATM QoS mapping. Each logical FR connection with its own transfer priority is mapped to one ATM VCC with a corresponding service category. The mapping between FR transfer priority and ATM service category is basically arbitrary. For example, transfer priority 15 might be mapped to CBR, transfer priorities 9,6 might be mapped to VBR-rt, and transfer priority 3 might be mapped to VBR-nrt. The remaining transfer priorities mapped to UBR. The transfer priority for LMI signalling relating to a particular data connection is necessarily mapped to the same ATM service category as the data connection it relates to since it is carried on the same VCC. Unfortunately, this interworking is achieved with a significant overhead, since there must be one signalling channel per logical connection.

In another existing FR-ATM network interworking solution which also adheres to the ITU-T recommendation I.555, a number of logical FR connections are multiplexed into a single ATM VCC. Multiplexing is accomplished at the FR-SSCS (service specific convergence sublayer) sublayer using DLCIs. This is many-to-one interworking. An example of this is illustrated schematically in FIG. 2 in which three logical FR connections are mapped to DLCI-100, DLCI-200, and DLCI-300 of a single VCC 0.26. In addition, a single DLCI-0 carries all signalling information over the same VCC 0.26. This solution somewhat reduces the amount of signalling overhead.

Figure 3:
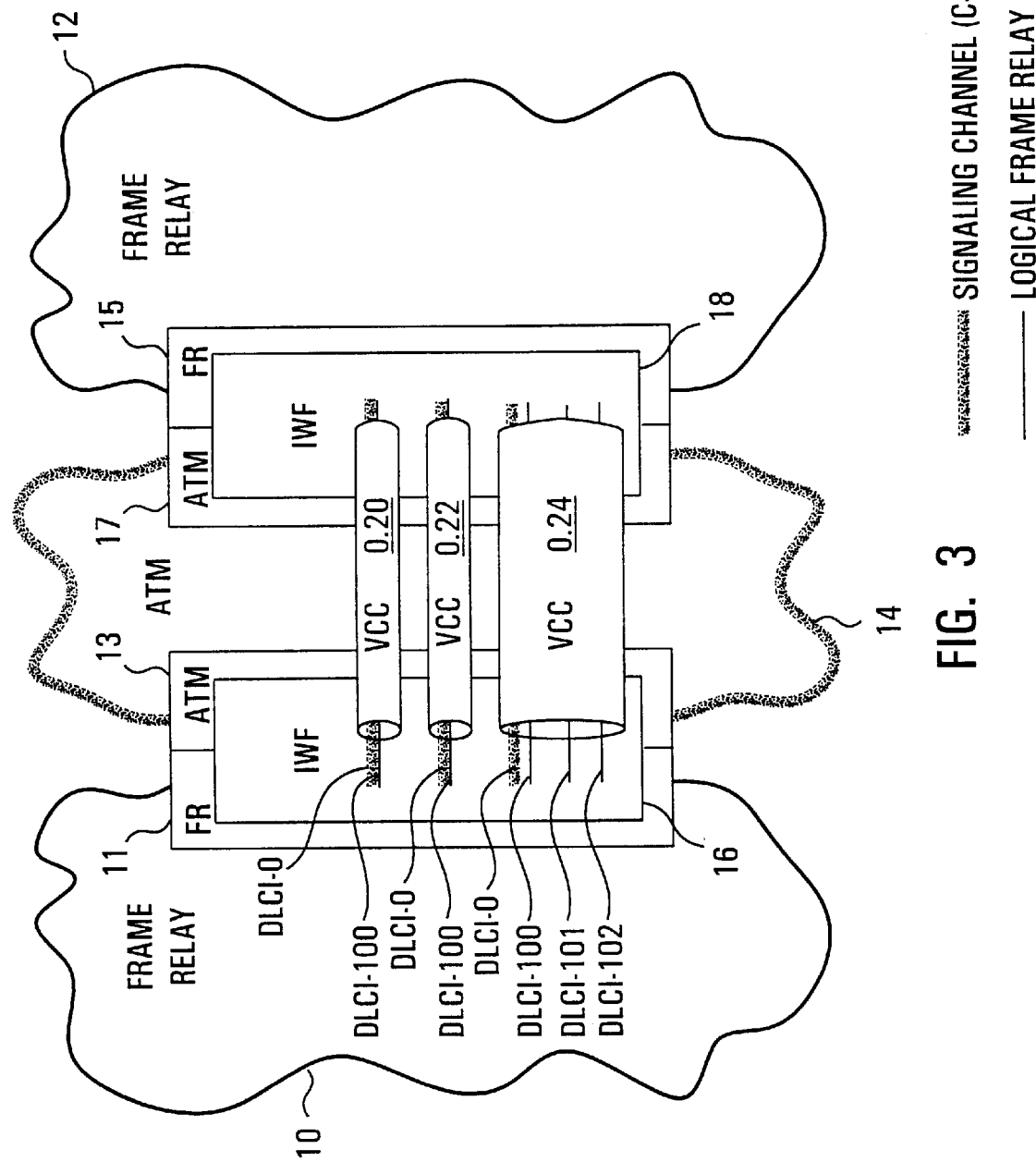

By combining the two above solutions, one arrives at the FRF.5 network interworking function which is illustrated schematically by way of example in FIG. 3. In the illustrated example, there are five logical FR connections which are to be carried over three ATM "FRF.5 connections" (i.e. three VCCs) between two IWFs, and the connections are identified as DLCI-100 carried over VCC 0.20, DLCI-100 over VCC 0.22, DLCI-100 over VCC 0.24, DLCI-101 over VCC 0.24, and DLCI-102 over VCC 0.24. In addition, according to FRF.5, LMI messages are exchanged over a respective DLCI-0 of every ATM VCC associated with the network interworking function. In the illustrated example, there is a respective DLCI-0 over each of the VCCs 0.20,0.22,0.24 which carries signalling information in relation to all of the logical FR connections of the respective VCC. It can be seen that the DLCIs associated with each logical FR connection may not be unique, in this case DLCI-100 being associated with three different logical FR connections. According to this proposal, there may be one-to-one mapping as used over VCCs 0.20,0.22 and there may be many-to-one mapping as used over VCC 0.24. In setting up traffic parameters according to the FRF.5 solution, no account is made for LMI traffic.

In all of the above described solutions, control/signalling information is carried with no distinction from data across each ATM connection. In other words, the ATM network gives the same priority to signalling messages as to the data itself.

A FR-ATM interworking solution according to an embodiment of the invention employs one dedicated ATM VCC to carry a FR interworking signalling channel and employs one-to-one or many-to-one mapping of logical FR connections within a pair of extended "logical" interworking functions. In other words, a dedicated signalling channel controls a number of logical FR connections, carried on one or several distinct ATM VCCs. Multiplexing is accomplished at the ATM layer using vpi.vci's and at the FR-SSCS sublayer using a unique DLCI for each connection within the logical interworking function.

Figure 4:
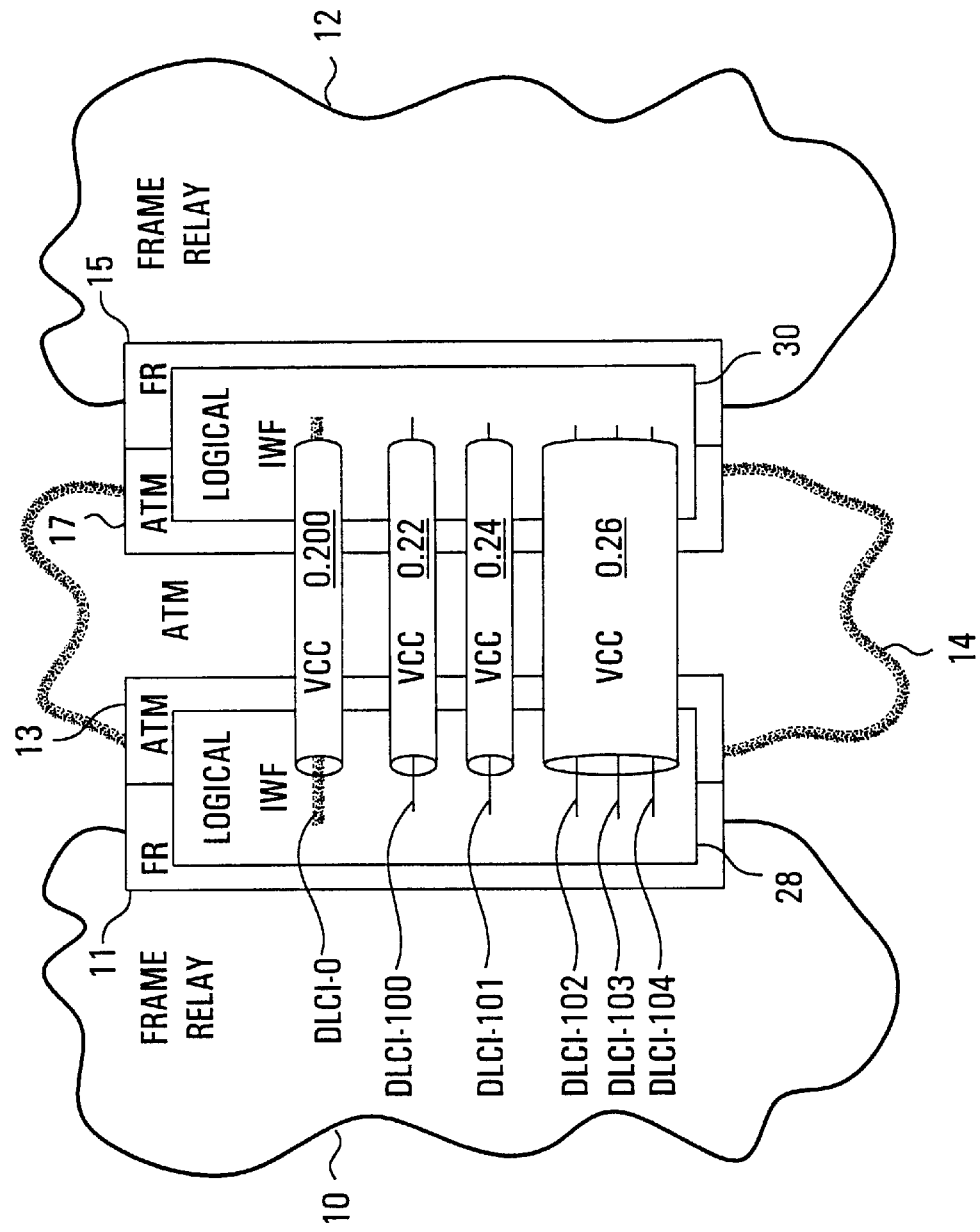
FIGS. 4–8 are schematic diagrams of FR-ATM interworking solutions according to embodiments of the invention.

An example of this is shown in FIG. 4 where the logical IWFs provided by an embodiment of the invention are indicated by 28,30 and it is assumed that there are five logical FR connections. All the signalling for all five logical FR connections is carried on a DLCI-0 assigned to a dedicated VCC 0.200. The five logical FR connections are carried over VCCs 0.22,0.24,0.26 in both one-to-one fashion as in VCCs 0.22,0.24 where DLCI-100 on VCC 0.22 identifies a first logical FR connection and DLCI-101 on VCC 0.24 identifies a second logical FR connection, and in many-to-one fashion as in VCC 0.26 where DLCI-102, DLCI-103 and DLCI-104 identify third, fourth and fifth logical FR connections.

Preferably, the ATM VCC dedicated to the exchange of signalling/LMI messages uses the ATM QoS VBR-nrt. Its traffic parameters including peak cell rate, sustained cell rate and maximum burst rate may be determined by examining LMI traffic characteristics. For example, the ATM sustained cell rate may be modelled as the capacity required to carry normal 12 octet FR status enquiry/status reply exchanges which are made ever T391 seconds (T391 is an LMI provisionable parameter). Using worst case (T391=1 second) full status replies for the full usable range of DLCIs (16–1007) this yields a single 12 octet status enquiry requiring a single ATM cell, and a status reply having a 12 byte header and 5 bytes of status for each of the 992 DLCIs. Together, these require approximately 104 ATM cells. Thus a conservative SCR would be 105 cells/second, while a more aggressive SCR would be 105/T391 cells/sec. The peak cell rate can be modelled as capacity required to carry FR 13 octet asynchronous status reports. Supposing all DLCIs fire an asynchronous status report simultaneously, the PCR would be the above identified SCR plus 13*992 octets/sec= SCR+992 cells/second. Finally, the maximum burst size may be calculated on the basis of all asynchronous, enquiry and reply messages happening at once in which case MBS= PCR*1 second.

It is noted that during the initial configuration of the ATM network, a number of VCCs between the IWFs must be provisioned instead of only one. The number required will depend upon the number of different QoS's to be supported, and on whether one-to-one and/or many-to-one mapping is to be employed.

Additional examples will now be described with reference to FIGS. 5–8. In each of these examples, there are clouds 10,12 for the FR network, cloud 14 for the ATM network, and two logical IWFs 28,30 according to an embodiment of the invention. In the example of FIG. 8, there are four logical IWFs 28,30,36,38.

Figure 5:
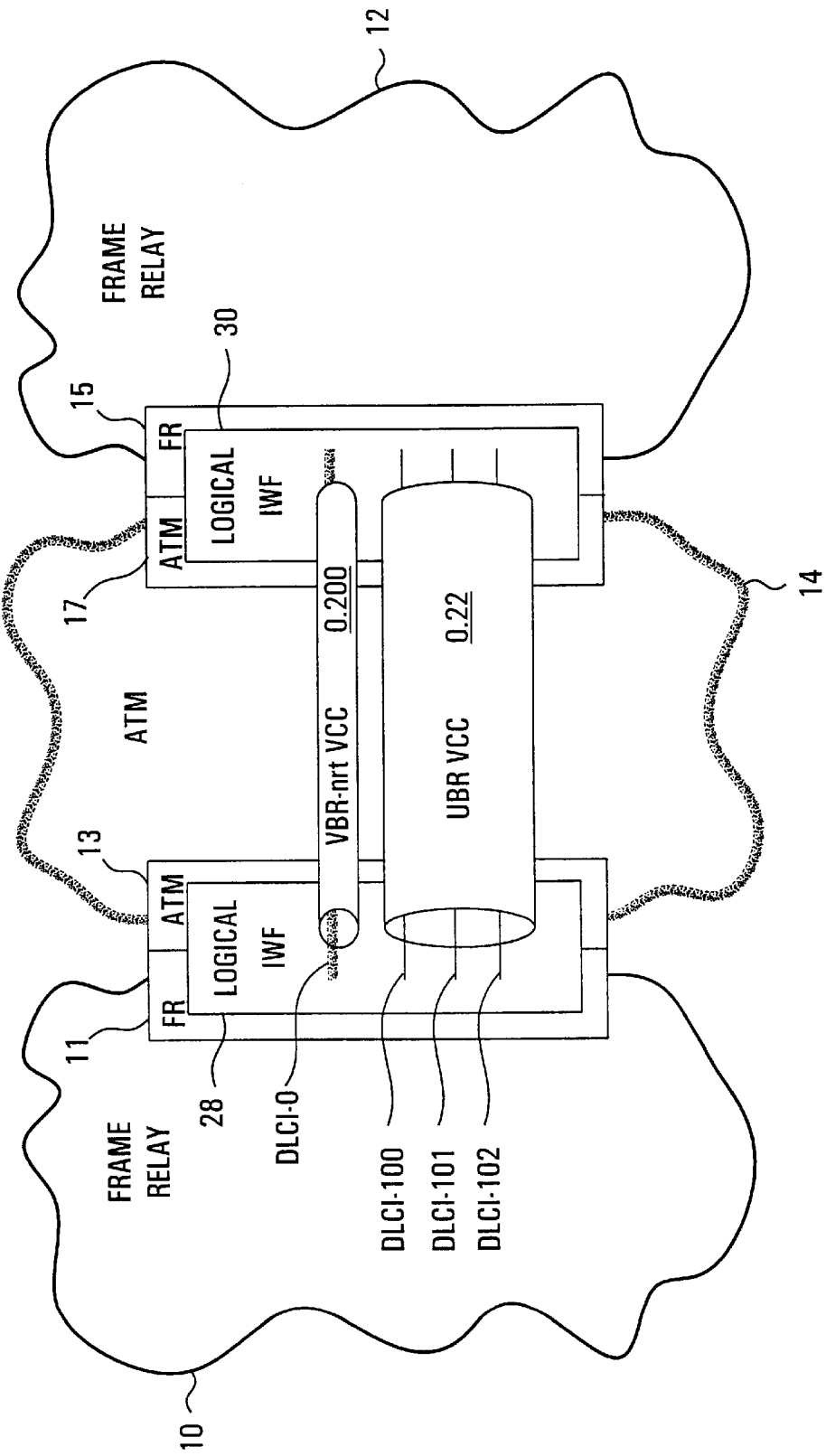

Referring firstly to FIG. 5, in this example, there are three FR logical connections all of which share the same transfer priority which happens to be low. According to the above exemplified service mappings, this maps to the UBR ATM QoS. Thus, the logical IWFs 28,30 in this case maintain a total of two ATM VCCs, namely VCC 0.200 which handles the signalling messages using the VBR-nrt ATM QoS, and VCC 0.22 which multiplexes all three logical connections DLCI-100, DLCI-101, DLCI-102 using the UBR service category. This example features single transfer priority, many-to-one multiplexing.

Figure 6:
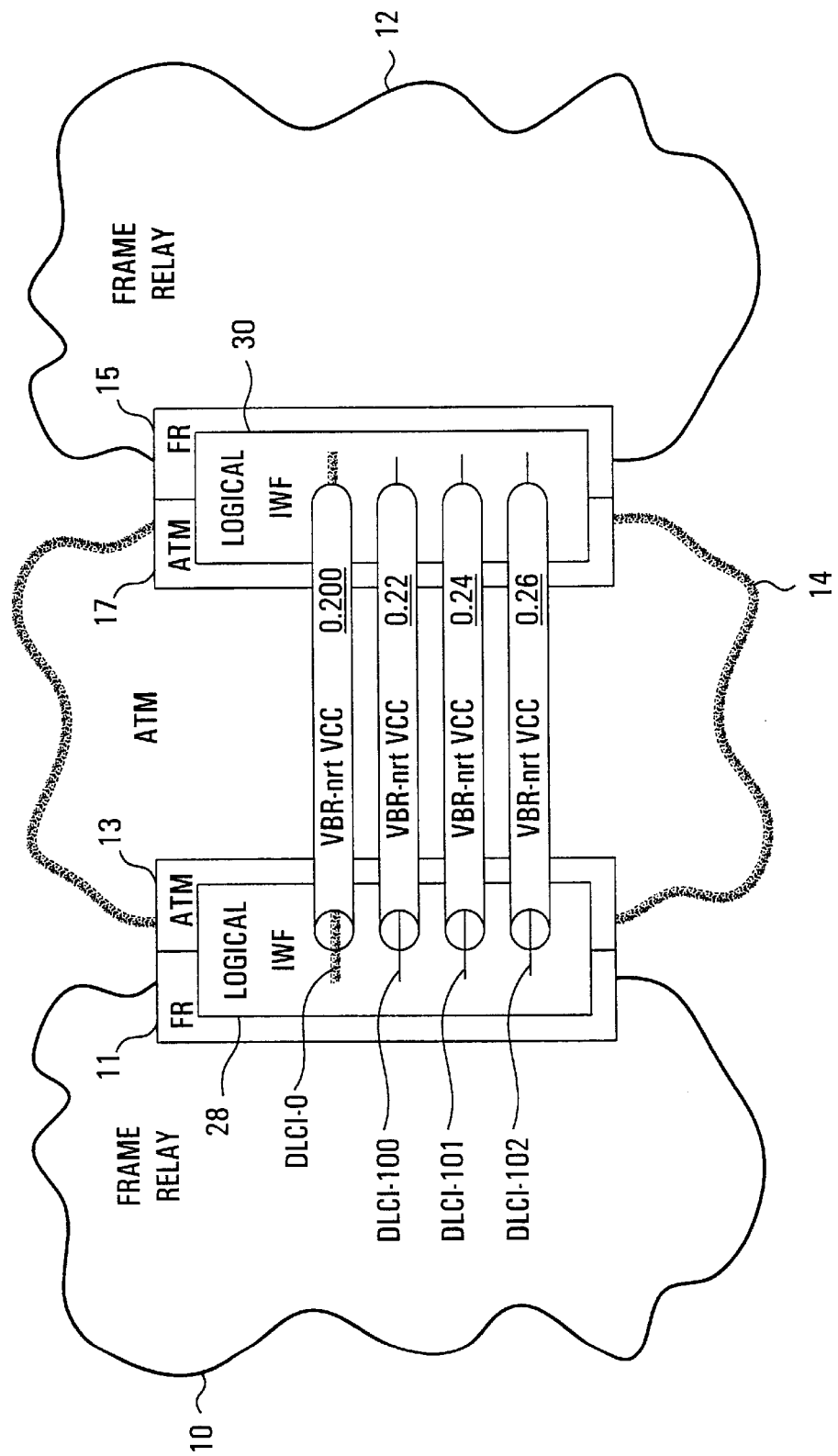

Referring next to FIG. 6, in this example, there are three FR logical connections all of which share the same transfer priority which happens to be map to the VBR-nrt ATM QoS. In this example, the logical IWFs 28,30 maintain a total of four ATM VCCS, namely VCC 0.200 which handles the signalling messages using the VBR-nrt ATM QoS, and three VCCs 0.22,0.24,0.26 which each handle one of the logical connections DLCI-100, DLCI-101, DLCI-102 also using the VBR-nrt service category. Since the FR-SSCS DLCI number is unique for each FR logical connection, one signalling channel can maintain several one-to-one multiplexings. This example features a single transfer priority, and one-to-one multiplexing. The choice of one-to-one or many-to-one multiplexing is decided at provisioning time by a network operator and is completely arbitrary.

Figure 7:
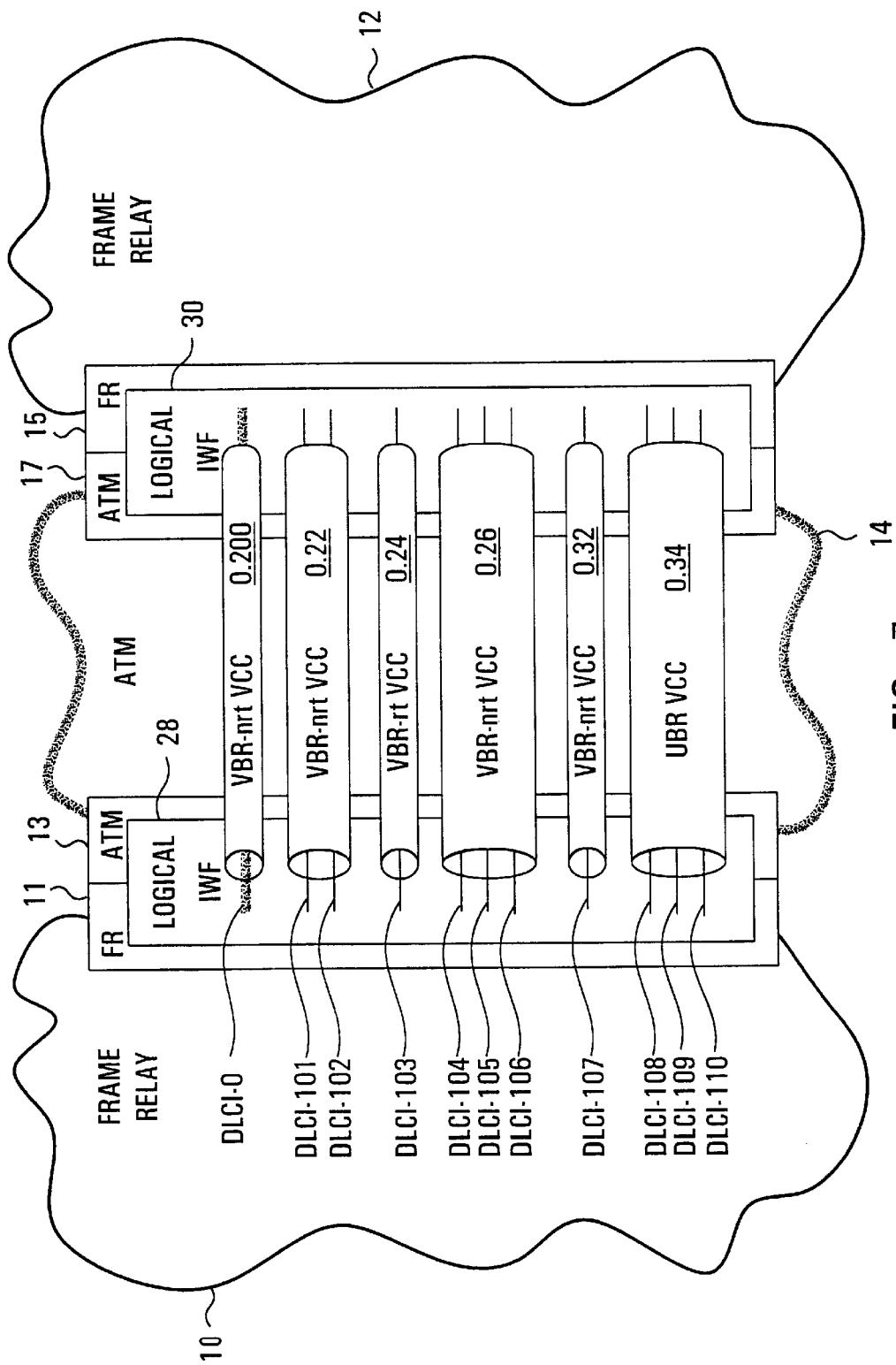
Figure 8:
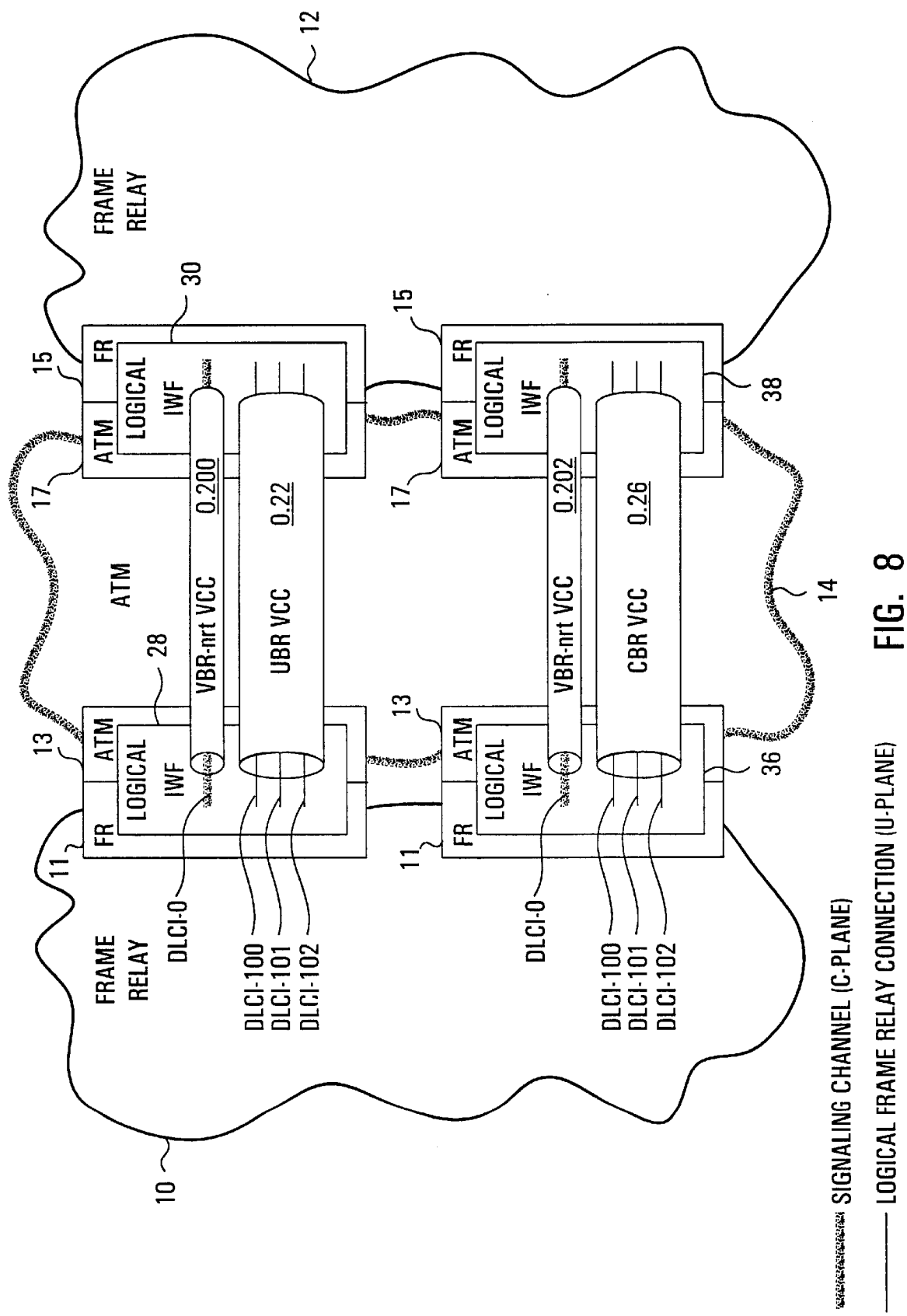

Referring now to FIG. 7, in this example, there are ten FR logical connections which are assigned several different transfer priorities. Two of these map to CBR and are carried over VCC 0.22 on DLCI-101, DLCI-102, another maps to VBR-rt and is carried over VCC 0.24 on DLCI-103, another four map to VBR-nrt three of which are carried over VCC 0.26 on DLCI-104, DLCI-105, DLCI-106 and one of which is carried over VCC 0.32 on DLCI-107, another three map to UBR and are carried over VCC 0.34 on DLCI-108, DLCI-109, and DLCI-110. Once again, a single dedicated VCC 0.200 carries all signalling information with ATM QoS VBR-nrt. This example includes multiple transfer priorities, many-to-one and one-to-one multiplexing.

There may be more than one pair of logical IWFs 28,30 each handling a respective group of logical FR connections. In such case, for FR signalling relating to all the logical FR connections carried through one logical IWF, a separate dedicated ATM VCC is allocated. An example of this is shown in FIG. 8. In this example, there are three logical FR connections carried between logical IWFs 28,30 each with transfer priorities mapping to the ATM QoS UBR. These are carried over a single VCC 0.22 on DLCI-100, DLCI-101, DLCI-102, and DLCI-0 of a VCC 0.200 is used for signalling information for those logical connections. In addition, there are three logical FR connections carried between logical IWFs 36,38 each with transfer priorities mapping to the ATM QoS CBR. These are carried over a single VCC 0.26 as DLCI-100, DLCI-101, DLCI-102, and DLCI-0 of another VCC 0.202 is used for signalling information for those logical connections. Of course the pairs of IWFs may in fact span different ATM networks and/or end up in different FR networks.

The above described embodiment provides a dedicated FR signalling channel between IWFs connected together by ATM for use with provisioned VCCs (PVCs). In other words, the signalling channel, and one or more traffic VCCs are provisioned, and "hard-wired" FR connections are routed through these VCCs as described above.

All of the above discussed configurations are chosen and put in place by the network operator at provisioning (i.e. network setup) time. They are completely static, and any change is made by the network operator whenever it is deemed necessary. For example, a new DLCI can be added to an existing VCC on an existing logical IWF; a new DLCI can be added on a new VCC on an existing logical IWF, etc. The LMI is consistently used to signal such new connections.

Figure 9:
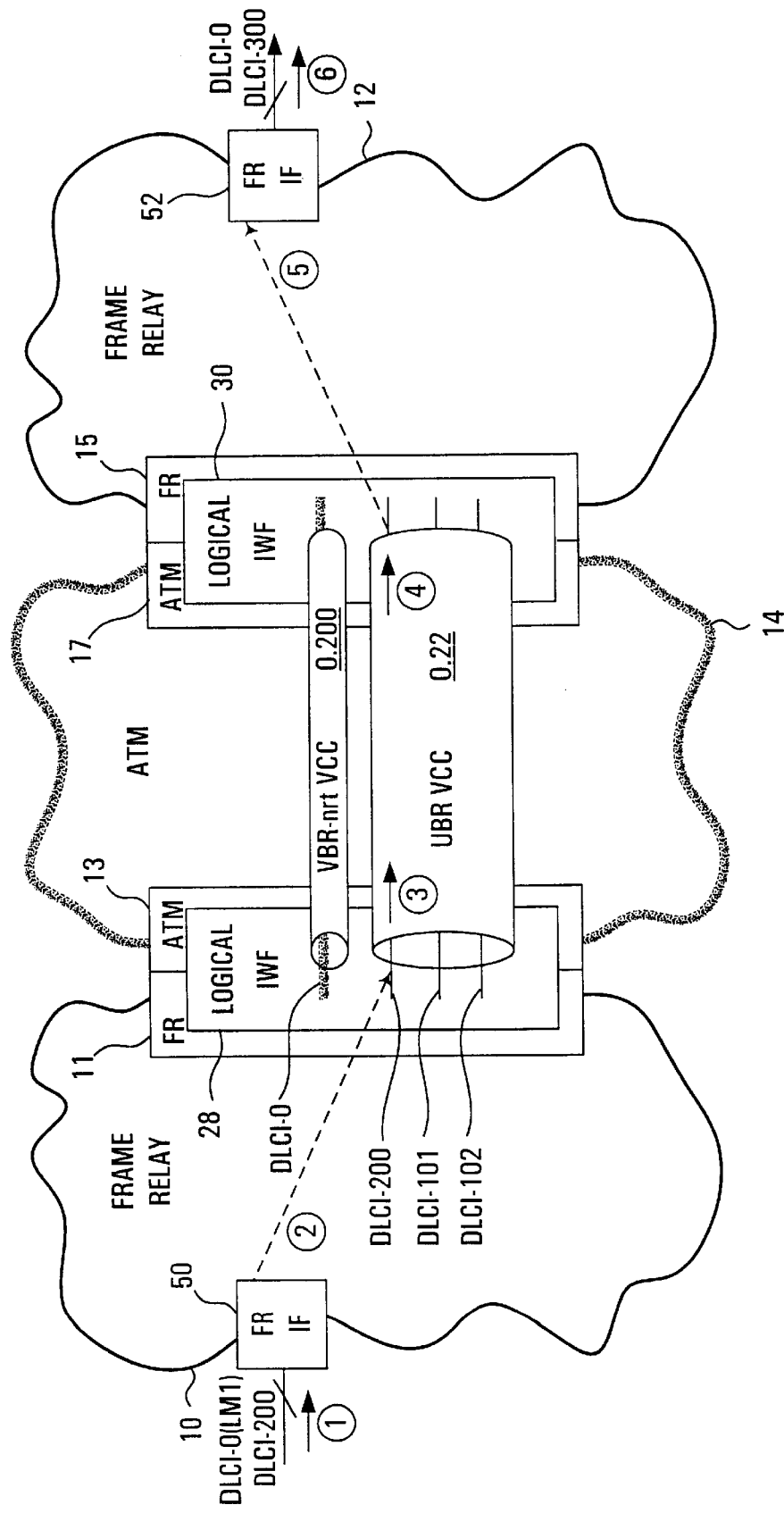
FIG. 9 is an example data path message flow.

Of course, the actual data transfer that happens between the IWFs is dynamic. For the purpose of illustration, the data path is shown in FIG. 9 with egress and ingress FR interfaces 50,52 at the edges of the FR networks. Data path steps are indicated by arrows with small numbered circles.

At step 1, a frame comes in the FR interface 50 for DLCI 200 on an HDLC link. In step 2, the internal multiplexing table in FR interface 50 forwards the frame to logical IWF 28 on DLCI 100 as per static PVC configuration. In step 3 the logical IWF 28 receives the frame for DLCI 100, segments it into ATM cells, and sends them through ATM VCC 0.22. Of course there may be other well understood steps which are taken here such as AL5 encapsulation, and these will not be described here. In step 4, logical IWF 30 gets the cells and reassembles the frame. In step 5, the logical IWF 30 maps DLCI 100 frame to FR interface 52, DLCI 300 through internal multiplexing table as per static PVC configuration and outputs the frame. Finally, in step 6, the FR interface 52 receives the frame for DLCI-300 and sends it out onto an HDLC link.

Figure 10:
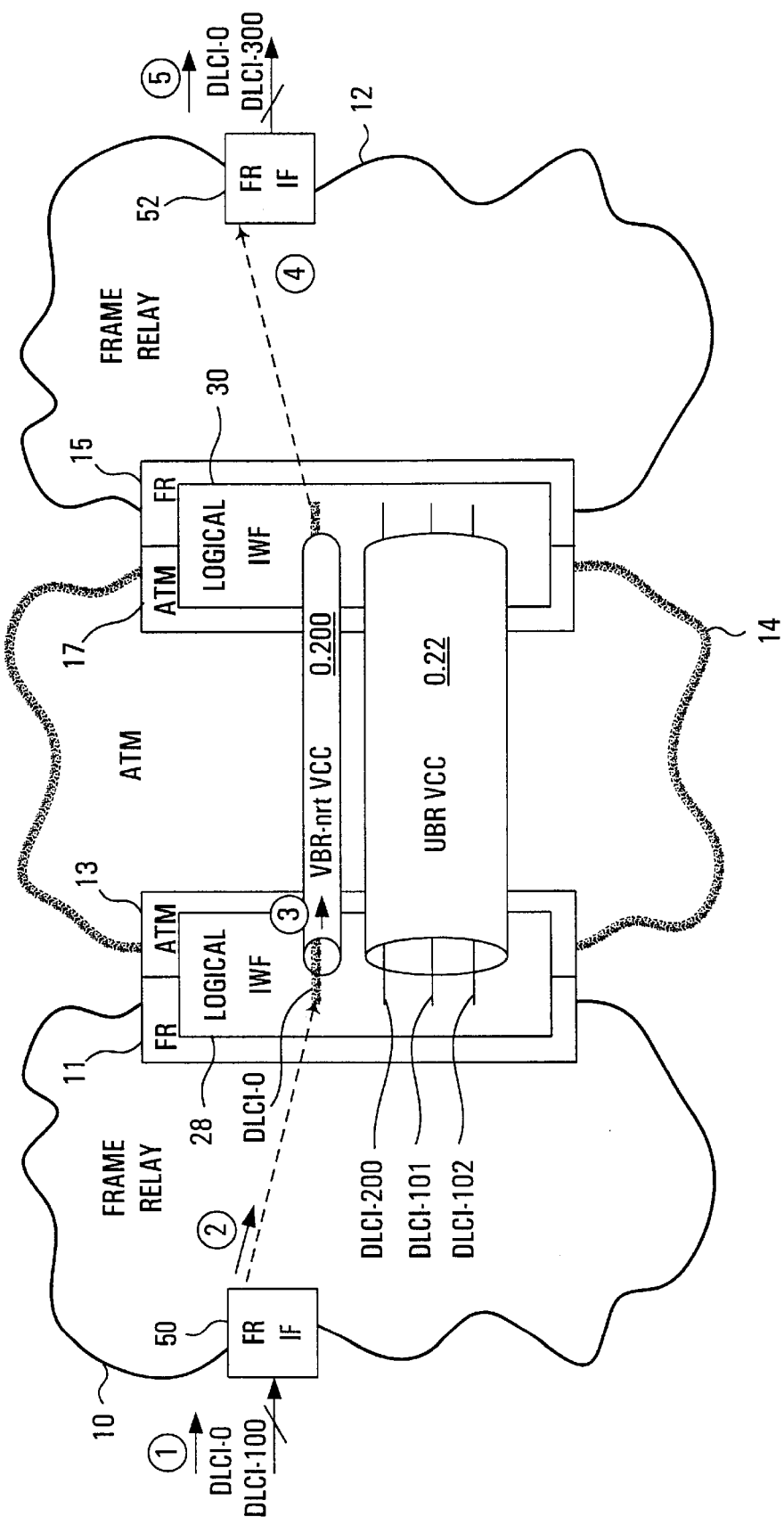
FIG. 10 is an example signal path message flow.

The relaying of PVC status information on the LMI channels is also dynamic as shown in FIG. 10 which will now be briefly described. In step 1, FR interface 50 receives an LMI status report on DLCI 0 indicating a status change for DLCI 100 (for example new→deleted or vice versa; active→inactive or vice versa). In step 2, a multiplexing table in FR interface 50 maps DLCI-100 to logical IWF 28, DLCI-200. The status change for DLCI-200 is sent to IWF 28. In step 3, the logical IWF 28 receives the status change message, forwards (segmented into cells) onto the signalling channel VCC 0.200, DLCI-0 as an LMI message. Logical IWF 30 receives the ATM cells and reassembles the LMI frame and reads the status message for DLCI-200. The multiplexing table in logical IWF 30 maps DLCI-200 to FR interface 52, DLCI-300, and logical IWF 30 forwards the status change message there. The FR interface 52 receives the status change message for DLCI-300, and forwards it on DLCI-0 (LMI) of its HDLC link.

Figure 11:
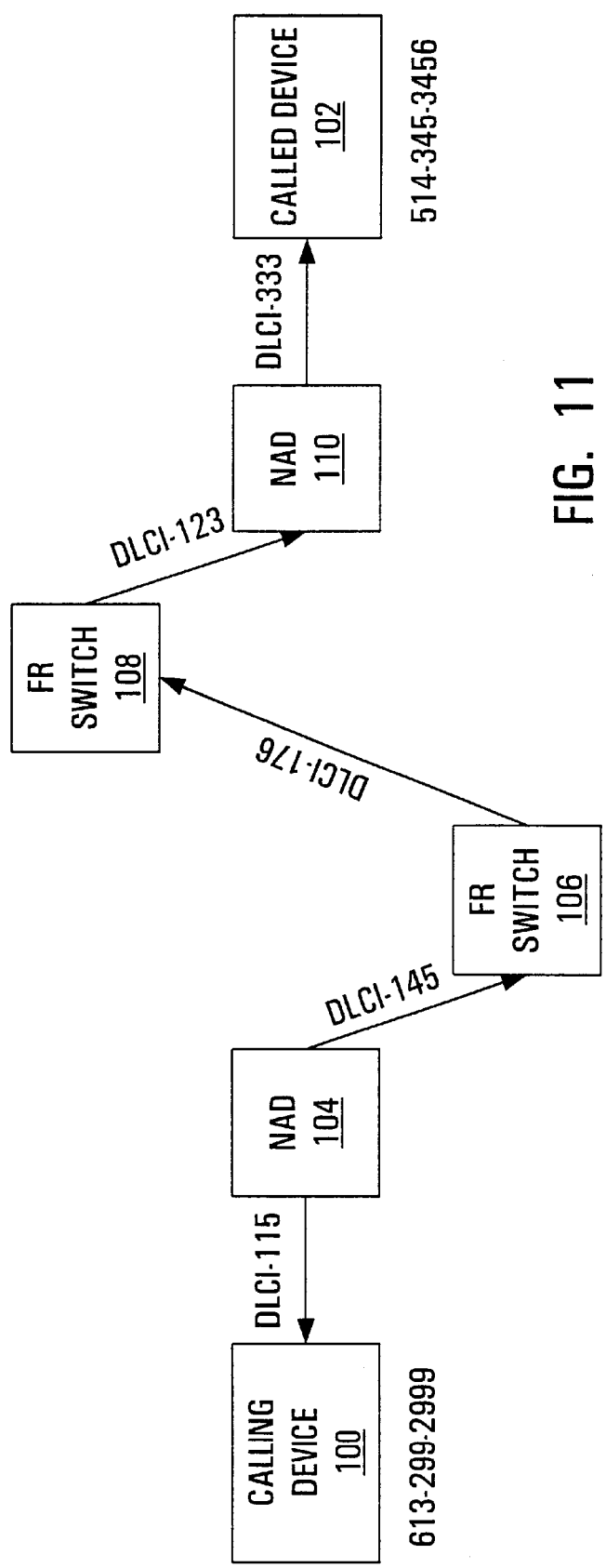
FIG. 11 is a block diagram of an example FR network.

Another embodiment will now be described in which FR connections may be dynamically connected through an ATM network. As a background for this embodiment, the basics of a simplified frame relay call setup will be described by way of example with reference to FIG. 11 which assumes a strictly frame relay network. A first user at a calling device 100 having a calling frame relay address 613-299-9999 wants to call a second user at a called device 102 having a called frame relay address 514-345-3456. It does this by sending a call setup message to a first NAD 104 (network access device). The call setup message includes the following:

calling address: 613-299-9999
called address: 514-345-3456
bandwidth parameters: CIR, EIR, BC, Be
transfer priority 0 to 15
requested DLCI DLCI-115 where CIR is the committed information rate, EIR is the excess information rate, BC is the committed burst rate, and Be is the excess burst rate. The network access device 104 uses the called address to look up in a routing table the next node which should be used to make the connection, this being the first FR switching node 106, and forwards the call setup message to the switching node 106 with a new preferred DLCI for the link between the network access device and the switching node, for example DLCI-145. Similarly, the call setup message is forwarded on hops to a second FR switching node 108, a far end network access device 110, and finally the called device 102 with respective DLCIs being requested on each of these hops. These might be, for example, DLCI-176 between the first and second nodes 106,108, DLCI-123 between the second node 108 and the far end network access device 110, and DLCI-333 between the far end network access device and the called device 102. The far end called device 102 responds with a connect message which is propagated back to the originating device with the result that the requested DLCIs are established. A DLCI in-out mapping is maintained at each point in the connection which is used to switch the FR data packets over the established connection. For example, FR switch 106 would include a mapping from DLCI-145 to DLCI-176 for this connection.

Figure 12:
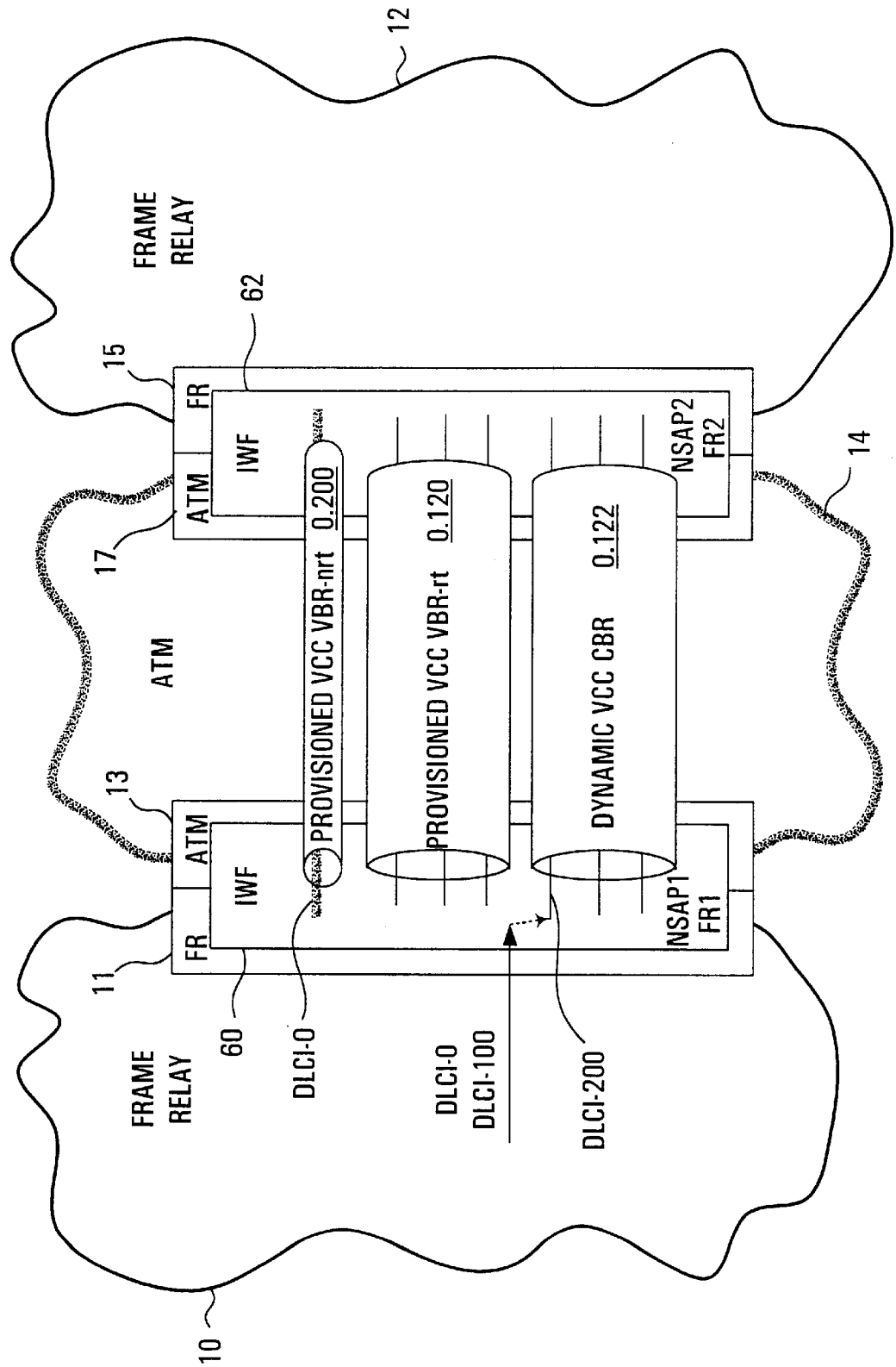
FIG. 12 is an example of a FR-ATM interworking solution according to an embodiment of the invention.

The above introduced embodiment of the invention which allows FR connections to be dynamically connected through an ATM network will now be described with reference to FIG. 12. Once again, there are two clouds 10,12 representing two frame relay networks or two portions of a frame relay network, and a cloud 14 representing an ATM network, and two IWFs 60,62 provided at the interfaces between the networks. According to this embodiment of the invention, like the previous embodiment, there is a provisioned VCC 0.200 between the two IWFs 60,62 which has a DLCI-0 reserved for signalling and which is preferably VBR-nrt. However, in contrast to the previous embodiment, the signalling to be carried on this link includes frame relay call setup and tear down signalling which may for example be in accordance with ITV-T standards Q.933 or X.76. There may also be zero or more additional provisioned VCCs between the two IWFs each with a respective ATM service category. In the illustrated example, there is a single additional provisioned VCC 0.120 with ATM service category VBR-rt. These may be provisioned for the purpose of providing permanent FR connections as described previously, in which case LMI signalling is carried over the signalling channel VCC 0.200. In addition or alternatively, these provisioned VCCs may include bandwidth available for dynamic allocation as described in detail below. Depending upon a particular connection scenario, there may also be additional dynamic VCCs connected between the IWFs. In the illustrated embodiment, there is a single dynamic VCC 0.122 with the ATM CBR service category.

This embodiment allows the creation of FR (switched virtual circuits) SVCs to extend across the ATM network.

In order to provide support for this embodiment, the FR node on which the IWF resides has a static address routing table. The IWF also has a provisionable and flexible frame relay transfer priority to ATM service category mapping and a frame relay to ATM bandwidth parameter conversion policy mapping. These collectively will be referred to as a service conversion mapping. In certain cases, the IWFs may require ATM addresses (NSAP), or frame relay addresses. These circumstances will be detailed below. For the purpose of example, it is assumed that the near end IWF 60 has ATM address NSAP1 and has FR address FR1, and that the far end IWF 62 has ATM address NSAP2 and has FR address FR2. The IWFs also have in-out DLCI assignment tables.

The static routing table is exemplified in FIG. 13. It allows a determination that an incoming FR setup message needs to be sent across the IWF. The basic format of the routing table consists of records of the format: (destination FR address; next node). Typically, rather than including individual FR addresses in the routing table, groups of addresses will be identified by a prefix for example. The first record in the example table relates to a group of FR addresses all of which require routing to some other FR node in the FR network. The second group of FR addresses relates to a group of FR addresses which require routing to a first near end IWF, namely IWF-1. The third group of FR addresses relates to a group of FR addresses which require routing to a second near end IWF, IWF-2. Both near end IWFs IWF-1, IWF-2 will have corresponding far end IWFS. There may be many IWFS at a given FR node with interworking, but for the purpose of simplifying the explanation which follows, it will be assumed that there is only one.

The service conversion mapping maps ATM specific parameters (the ATM service category, MBS (maximum burst size), SCR (sustained cell rate), and PCR (peak cell rate)) to the FR specific parameters (FR transfer priority, CIR,EIR,BC, and Be). This service conversion is provisionable at each IWF and is flexible. Two mappings will be given here by way of example:

Mapping 1
   FR TP→ATM service category
   FR CIR (bits/s)→ATM SCR (cells/s)
   FR EIR (bits/s)→ATM PCR (cells/s)
   FR BC (bits)→ATM MBS (cells)

Mapping 2
   FR TP→ATM service category
   FR CIR+EIR (bits/s)→ATM SCR (cells/s)
   FR Link Rate (bits/s)→ATM PCR (cells/s)
   FR BC+Be(bits)→ATM MBS (cells)

The DLCI in-out assignment tables function like normal FR in-out DLCI assignment tables, with incoming DLCIs mapped to appropriate outgoing DLCIs. The only difference is that the DLCIs between the two IWFs are carried over an ATM VCC. The DLCI in-out mapping consists of a series of records of the form (DLCI-in, DLCI-out, vpi.vci) where DLCI-in is the DLCI on the FR side of the IWF, DLCI-out is the DLCI on the ATM side of the IWF, and vpi.vci identifies an ATM VCC to which the DLCI has been assigned as described further below.

Figure 14A:
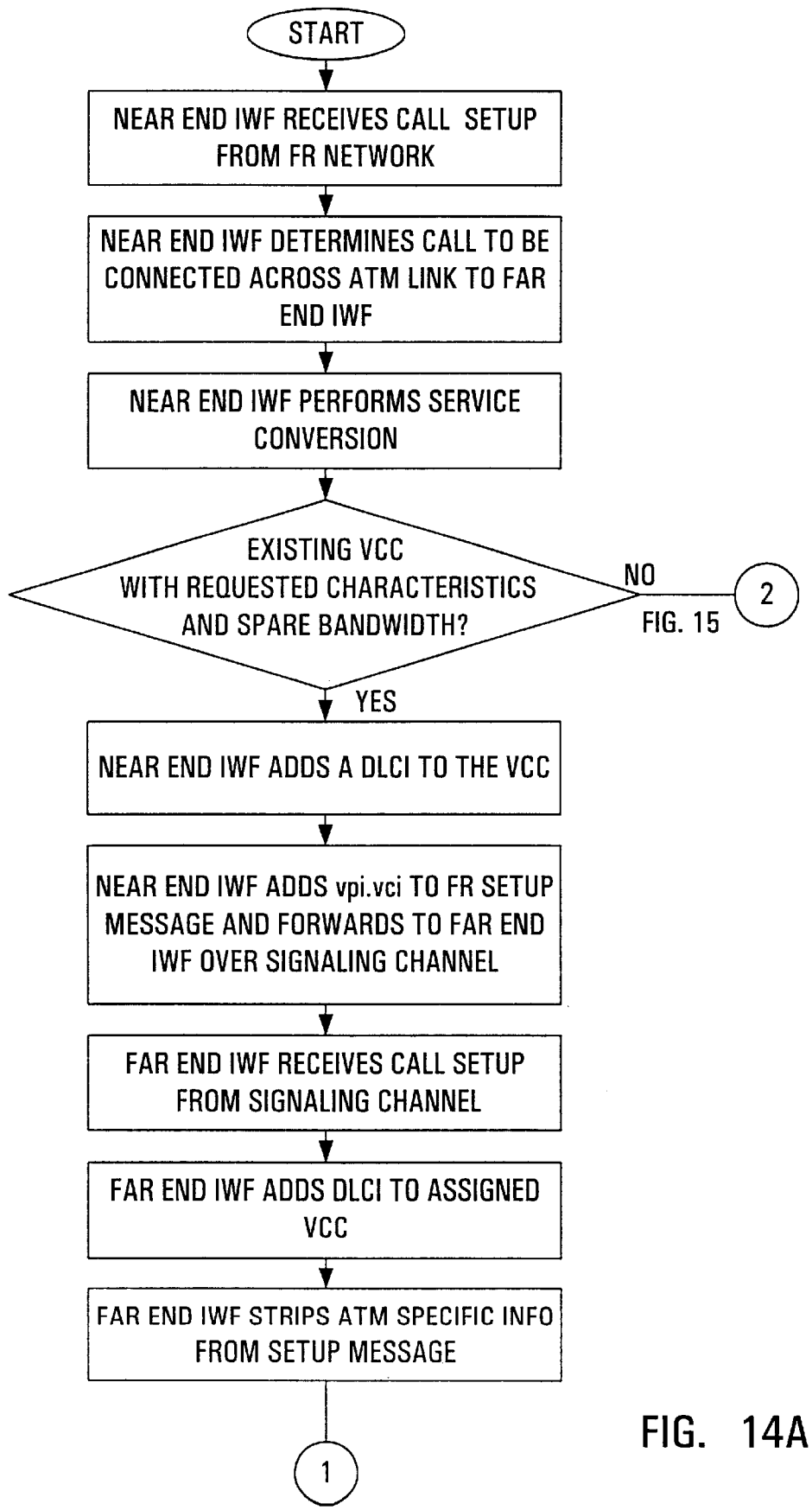
FIGS. 14 and 15 are flowcharts for a method of performing FR call setup signalling across an ATM network.
Figure 14B:
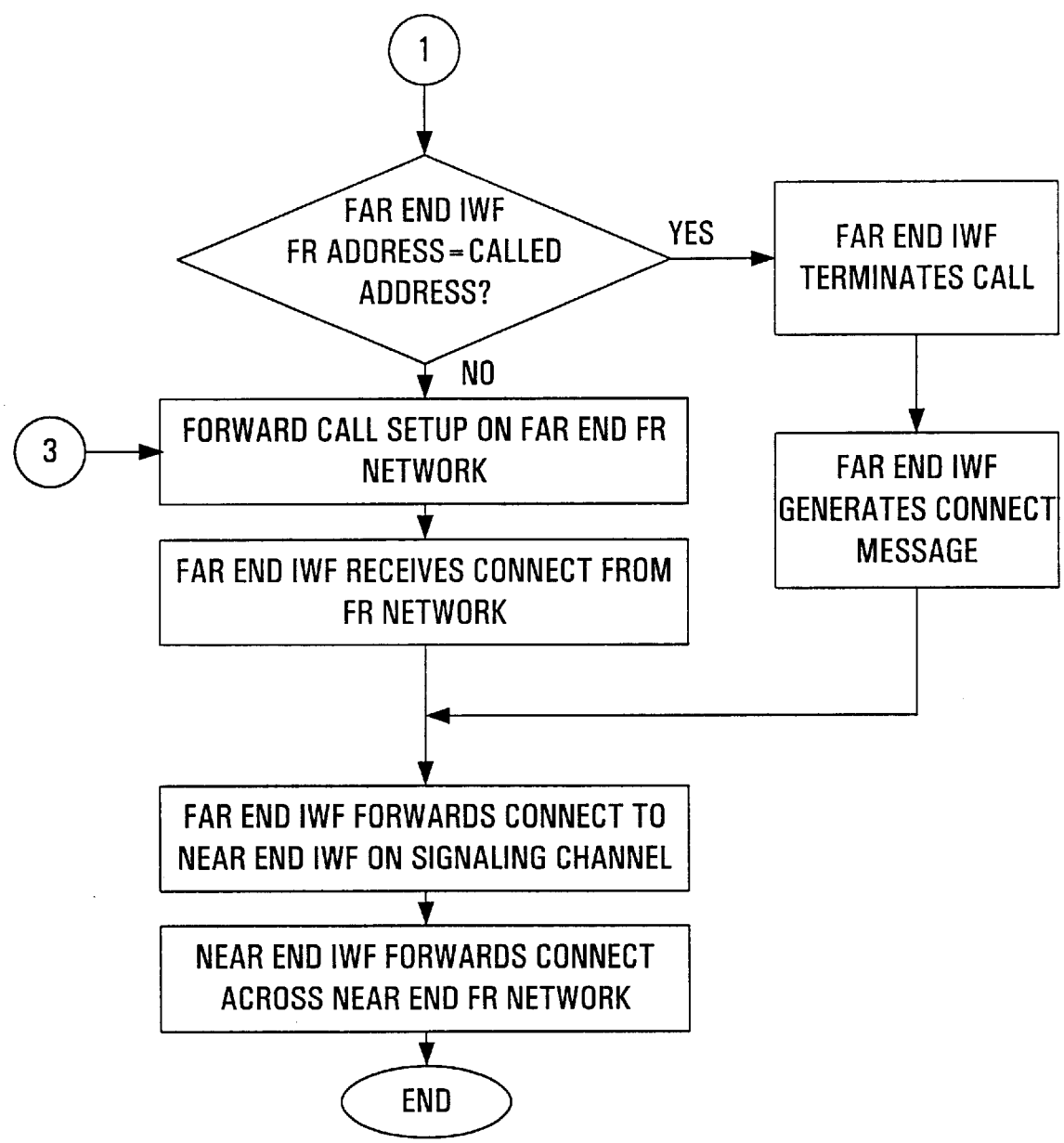

The steps performed by the near end and far end interworking functions to set up a call will be described with reference to the flowchart appearing in FIG. 14.

A call setup message is assumed to reach the FR node 11 containing the near end IWF 60 from the FR network 10 according to normal FR call setup flow as described above. The near end FR node 11 looks up the called FR address in its static routing table and determines that the setup must be routed through the IWF 60. The near end IWF 60 performs the service conversion mapping to identify the type of ATM VCC required to complete the connection.

At this point a search is made for an existing VCC (provisioned VCC or dynamic VCC) with matching transfer priority and excess bandwidth to support the call. A different procedure which will be described later is taken if no existing VCC is found. If such a VCC is found, then a calling DLCI is added to the VCC to reserve bandwidth on the VCC, and then the FR call setup is forwarded to the other end over the signalling channel 0.200. In addition to the FR call setup message information, information identifying the VCC which is to support the call is also sent. Conventional Q.933/X.76 signalling does not include information relating to the selection of a channel because the setup is routed only to a single FR node at a time. In order to facilitate identifying the VCC, preferably, this is sent as part of the user-user data parameter forming part of the FR call setup message. The near end IWF 60 recomputes the checksum after adding the ATM specific information. The additional information required is the calling NSAP (NSAP1) and the vpi.vci identifying the VCC. Other methods of conveying this VCC identification information to the far end IWF 62 may alternatively be used.

Next, the far end IWF 62 receives the setup message, and it also adds the DLCI to the assigned VCC to reserve bandwidth. It strips the ATM specific information from the FR setup message and recomputes the checksum. In the case that the called FR address matches the provisioned address FR2 for the far end IWF 62, then the far end IWF terminates the call. Alternatively, the far end IWF forwards it across the second FR network as with normal Q.933/X.76.

Eventually, a connect is received by the second IWF 62 from the far end of the second FR network 12 ( or is generated locally in the case of termination at the IWF). The far end IWF 62 sends a FR connect back to the near end IWF 60 over the signalling channel 0.200, and data transfer can begin. When the near end IWF 60 receives the connect, it forwards it back to the originator as per Q.933/X.76. Both the near end and far end IWFs 60,62 complete DLCI in-out mapping records which match the DLCI over the ATM link with a corresponding DLCI in the FR network.

A specific example will be given with further reference to FIG. 12. For this example it is assumed that a setup message for incoming DLCI-100 is received and that the service conversion requires a CBR VCC, and that the previously created dynamic CBR VCC 0.122 has capacity to handle the call. The near end IWF 60 determines that there is capacity, and assigns a new DLCI, for example DLCI-200 to the CBR VCC 0.122, and forwards the setup message through the signalling channel 0.200. The far end IWF 62 receives the setup message, assigns DLCI-200 to the CBR VCC and forwards the setup over the far end FR network 12. After a connect is received back, forwarded through the signalling channel, and passed back to the originator, a complete link will have been established.

Figure 15:
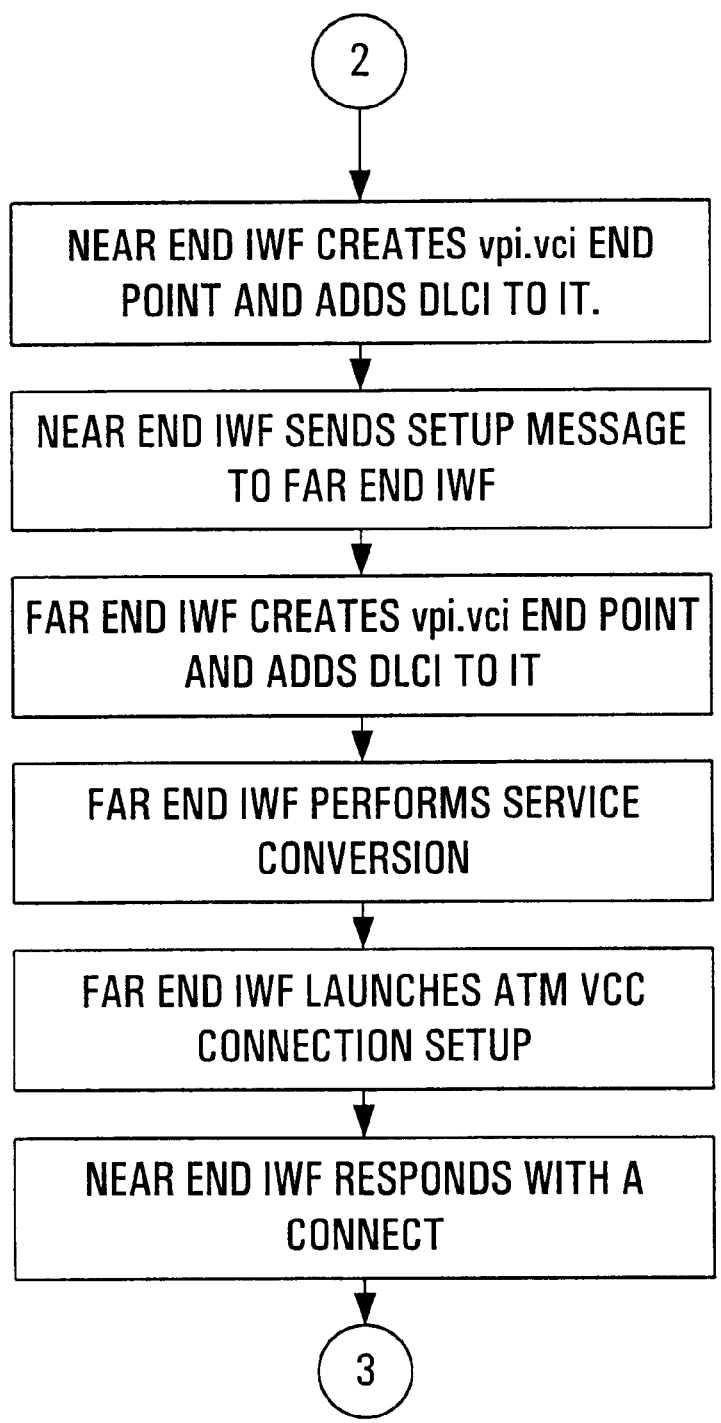

In the event that there is no capacity on an existing VCC or there is no existing VCC with the a service category equivalent to the transfer priority, a new dynamic VCC must be established between the two IWFs 60,62. A preferred method of achieving this will be described with reference to the flowchart of FIG. 15 which is a continuation of the flowchart of FIG. 14, although it is to be understood that the setup of a VCC can be achieved using any known ATM VCC setup mechanism.

To begin, the near end IWF 60 creates a first vpi.vci endpoint and adds a calling DLCI to it. This vpi.vci endpoint is added to the FR setup along with the near end ATM address NSAP1, preferably in the user-user data portion as described above. The setup message is sent to the far end IWF 62 which then creates a second vpi.vci endpoint and adds the DLCI to this endpoint. The far end IWF 62 extracts the transfer priority and CIR,EIR etc. in the FR setup message and determines an ATM service category and bandwidth conversion parameters using the service conversion mappings at IWF 62. Then the far end IWF launches a regular ATM VCC connection setup between the two IWFs 60,62. A standard ATM SVC setup message is used. This contains the calling ATM address (NSAP2), the called ATM address NSAP1 (received from the near end IWF in the user-user data portion of FR setup message), the calling vpi.vci (which is the second vpi.vci endpoint) and the called vpi.vci (which is the first vpi.vci endpoint which was also received from the near end IWF in the user-user data portion of the FR setup message). The ATM setup message also specifies the ATM service category and the bandwidth. The ATM setup uses standard ATM signalling (UNI, IISP or PNNI for example), and does not go over the dedicated FR signalling channel.

The near end IWF 60 receives the ATM call message, and matches the incoming call parameters with the previously created endpoint, and then proceeds with accepting the call by sending an ATM connect message back to the far end IWF 62. If it cannot handle the call, the near end IWF 60 rejects the call as per ATM signalling procedure.

Next, the far end IWF 62 receives the ATM connect, and proceeds with the FR setup message as normal by forwarding it on across FR network as with normal X.76/Q.933 after stripping the ATM specific contents and recomputing the checksum. The reminder of this case is the same as that described previously.

Connection Release

Connection release happens using conventional frame relay messaging eg. Q.933/X.76. When a connection release message is received by either IWF from the respective FR network, it is forwarded through the signalling channel 0.200 to the other end IWF which forwards it on through the FR network. Dynamically created FR connections, i.e SVC DLCIs are always removed from the VCC whether or not the VCC is a dynamic VCC or a provisioned VCC.

In the event that a connection release results in a dynamically created ATM VCC having all DLCIs removed from it, the VCC is cleared after the release is received through the IWF signalling VCC 0.200. Provisioned VCCs are not cleared when they do not multiplex any more DLCIs.

In the event that a VCC goes down due to some sort of error condition, the IWF will receive a message from the ATM network. This may be an ATM release message in the case of SVCs, or an ATM alarm message in the event of PVCs, for example. All dynamically created FR connections are removed from the VCC and Q.933/X.76 releases are sent through signalling channels on both sides of the IWFs for FR to release the FR connections. For the PVCs, (permanent FR connections), both IWFs signal an inactive condition through LMI signalling to their respective FR networks and the PVCs remain provisioned.

If a dynamically created VCC goes down, then all SVCs using that VCC are cleared, the VCC is deleted and Q.933/X.76 FR releases are sent.

If the signalling channel goes down, PVCs remain, inactive status is sent through LMI at both ends. In addition, the dynamic ATM VCCs are cleared, FR SVCs are cleared, and releases are sent at both ends.

Numerous modifications and variations of the present invention are possible in light of the above teachings. It is therefore to be understood that within the scope of the appended claims, the invention may be practised otherwise than as specifically described herein.

The above described embodiments have focussed on interworking methods and systems to interwork between ATM and FR networks. Of course, more generally, the method may be applied to interwork between a first network having a first native protocol, and a second network having a second native protocol for implementation by a near end IWF function located at an interface between the two networks. In such an application, each logical data connection incoming from the first network is mapped to one of one or more data connections between the near end IWF and the far end IWF. In addition, all control/signalling messages relating to the logical connections incoming from said first network are mapped to a dedicated signalling connection between the near end IWF and the far end IWF.

The embodiments of the invention in which an exclusive property or privilege is claimed are defined as follows:

1. A method of interworking between a first network having a first native protocol, and a second network having a second native protocol for implementation by a first IWF (interworking function) located at a first interface between the two networks, the method comprising:
   a) the first IWF maintaining a dedicated signalling connection to a second IWF located at a second interface between the two networks;
   b) upon receipt of a setup message from the first network, the first IWF assigning a data connection between the first IWF and the second IWF and forwarding the setup message over the signalling connection to the second IWF;
   wherein the first network is a FR (frame relay) network and the second network is an ATM (asynchronous transfer mode) network, and the setup message is an FR setup message, and said dedicated signalling channel is a first ATM VCC, and said data connection is a second ATM VCC.

2. A method of interworking between a first network having a first native protocol, and a second network having a second native protocol for implementation by a first IWF (interworking function) located at a first interface between the two networks, the method comprising:
   a) the first IWF maintaining a dedicated signalling connection to a second IWF located at a second interface between the two networks;
   b) upon receipt of a setup message from the first network, the first IWF assigning a data connection between the first IWF and the second IWF and forwarding the setup message over the signalling connection to the second IWF, the first IWF determining if an existing data connection can handle a new connection and if so the near end interworking function assigning the existing data connection and forwarding the setup message to the far end interworking function together with an identification of the existing data connection, if an existing data connection cannot handle a new connection, the second IWF launching a regular data connection setup to the first IWF.

3. A method according to claim 1, wherein step b) comprises:
   b1) the first IWF determining if an existing ATM VCC can handle a new connection and if so the near end interworking function assigning the existing ATM VCC and forwarding the setup message to the far end interworking function together with an identification of the existing ATM VCC;
   b2) if an existing ATM VCC cannot handle a new connection, the first IWF initiating the establishment a ATM VCC.

4. A method according to claim 3, wherein step b2) comprises:
   the first IWF creating an ATM VCC endpoint;
   the first IWF sending the FR call setup message to the second IWF over the signalling connection;
   upon receipt of an ATM setup message relating to the FR call setup message, the first IWF matching the message with the established ATM VCC endpoint and outputting an ATM connect message.

5. A method according to claim 1, further comprising the steps of:
   upon receipt of a FR call setup message over the signalling connection from the second IWF, the first IWF establishing an ATM VCC endpoint and launching an ATM setup message over the ATM network to the second IWF thereby establishing an ATM VCC;
   upon receipt of an ATM connect message from the second IWF, the first IWF forwarding the setup message on over the first network.

6. A method according to claim 3 further comprising the steps of:
   performing a service conversion between requested connection characteristics in the call setup message to identify requested ATM connection characteristics;
   in step b1), only using an ATM VCC with the requested ATM connection characteristics, and if one does not exist, performing step b2) to establish a new ATM VCC with the requested ATM connection characteristics.

7. A multiservice switching node comprising:
   an FR switch for receiving and sending frame relay frames over a frame relay network;
   an ATM switch for receiving and sending ATM cells over an ATM network;
   a DLCI in-out mapping which maintains a mapping of data DLCIs incoming from the frame relay network to DLCIs assigned to ATM VCCs on the ATM network; and which identifies a dedicated signalling ATM VCC for carrying FR LMI frames and FR signalling frames; and
   FR frame encapsulation circuitry for encapsulating incoming FR frames in ATM AAL5 frames, and dividing the AAL5 frames up into ATM cells, with each ATM cell containing the vci.vpi of the assigned ATM VCC in the case that the FR frame is a data frame, and with each ATM cell containing the vci.vpi of the dedicated signalling VCC in the case the FR frame is an LMI frame of an FR signalling frame;
   FR frame regeneration circuitry for taking incoming ATM cells from the assigned VCCs and the dedicated VCC and combining them to produce FR data frames, LMI frames and FR signalling frames as appropriate; and
   FR connection setup message processing means for receiving a setup message from the FR network, assigning a DLCI to an ATM VCC for new FR connection between the ATM switch and the far end IWF and forwarding the setup message over the signalling channel to the second IWF.

8. A node according to claim 7 further comprising:
   a tabulation of existing data connections and their available bandwidth;
   wherein the node assigns the DLCI to an existing data connection if one is available forwards the setup message to the far end interworking function together with an identification of the existing data connection;

wherein if an existing data connection cannot handle a new connection, the node initiates the establishment a new data connection.

9. A node according to claim 7, further comprising:

a service conversion mapping which maps FR connection characteristics to corresponding ATM connection characteristics;

wherein an existing ATM VCC is only used in the case that it has ATM connection characteristics corresponding with requested FR connection characteristics as determined by the service conversion mapping, and if one does not exist, initiating the establishment of a new ATM VCC with the requested ATM connection characteristics.

10. A method of interworking between a first network having a first native protocol, and a second network having a second native protocol for implementation by a first IWF (interworking function) located at a first interface between the two networks, the method comprising:

a) the first IWF maintaining a dedicated signalling connection to a second IWF located at a second interface between the two networks wherein the dedicated signalling connection is dedicated to the transmission of first network protocol signalling information associated with all of a plurality of data connections of the first network assigned between the first and second IWF;

b) upon receipt of a setup message from the first network, the first IWF assigning a data connection between the first IWF and the second IWF and forwarding the setup message over the signalling connection to the second IWF;

wherein the first network is a FR (frame relay) network and the second network is an ATM (asynchronous transfer mode) network, and the setup message is an FR setup message, and said dedicated signalling channel is a first ATM VCC, and said data connection is a second ATM VCC.

11. A method of interworking between a first network having a first native protocol, and a second network having a second native protocol for implementation by a first IWF (interworking function) located at a first interface between the two networks, the method comprising:

a) the first IWF maintaining a dedicated signalling connection to a second IWF located at a second interface between the two networks wherein the dedicated signalling connection is dedicated to the transmission of first network protocol signalling information associated with all of a plurality of data connections of the first network assigned between the first and second IWF;

b) upon receipt of a setup message from the first network, the first IWF assigning a data connection between the first IWF and the second IWF and forwarding the setup message over the signalling connection to the second IWF, the first IWF determining if an existing data connection can handle a new connection and if so the near end interworking function assigning the existing data connection and forwarding the setup message to the far end interworking function together with an identification of the existing data connection, if an existing data connection cannot handle a new connection, the second IWF launching a regular data connection setup to the first IWF.

12. A method according to claim 10 wherein step b) comprises:

b1) the first IWF determining if an existing ATM VCC can handle a new connection and if so the near end interworking function assigning the existing ATM VCC and forwarding the setup message to the far end interworking function together with an identification of the existing ATM VCC;

b2) if an existing ATM VCC cannot handle a new connection, the first IWF initiating the establishment a ATM VCC.

13. A method according to claim 12 wherein step b2) comprises:

the first IWF creating an ATM VCC endpoint;

the first IWF sending the FR call setup message to the second IWF over the signalling connection;

upon receipt of an ATM setup message relating to the FR call setup message, the first IWF matching the message with the established ATM VCC endpoint and outputting an ATM connect message.

14. A method according to claim 10 further comprising the steps of:

upon receipt of a FR call setup message over the signalling connection from the second IWF, the first IWF establishing an ATM VCC endpoint and launching an ATM setup message over the ATM network to the second IWF thereby establishing an ATM VCC;

upon receipt of an ATM connect message from the second IWF, the first IWF forwarding the setup message on over the first network.

15. A method according to claim 12 further comprising the steps of:

performing a service conversion between requested connection characteristics in the call setup message to identify requested ATM connection characteristics;

in step b1), only using an ATM VCC with the requested ATM connection characteristics, and if one does not exist, performing step b2) to establish a new ATM VCC with the requested ATM connection characteristics.

* * * * *